United States Patent [19]

Slovak et al.

[11] Patent Number: 5,119,860

[45] Date of Patent: Jun. 9, 1992

[54] FLOW RESTRICTOR FOR WATER PURIFICATION SYSTEMS

[75] Inventors: Jack P. Slovak; Robert A. Slovak, both of Incline Village, Nev.

[73] Assignee: Water Factory Systems, Irvine, Calif.

[21] Appl. No.: 597,446

[22] Filed: Oct. 15, 1990

[51] Int. Cl.⁵ .............................. F15D 1/02
[52] U.S. Cl. .................... 138/44; 138/40; 138/109; 138/137
[58] Field of Search ............ 138/40, 44, 137, 141, 138/177, 109, 145, 146

[56] References Cited

U.S. PATENT DOCUMENTS

| | | | |
|---|---|---|---|
| 1,895,022 | 1/1933 | Chandler | 138/109 |
| 3,109,461 | 11/1963 | Wolff et al. | 138/137 |
| 3,734,139 | 5/1973 | Zafiroglu | 138/146 |
| 3,828,112 | 8/1974 | Johansen et al. | 138/137 |
| 4,636,346 | 1/1987 | Gold et al. | 138/137 |
| 4,800,109 | 1/1989 | Washizu | 138/137 |

Primary Examiner—James E. Bryant, III
Attorney, Agent, or Firm—Leonard Tachner

[57] ABSTRACT

A flow restrictor that is intended primarily for use in a reverse osmosis water purification system of the type having a reverse osmosis membrane housing receiving feed water to be purified and generating purified water at a first outlet and waste water at a second outlet. The flow restrictor of the invention comprises a selected length of elongated, doubly-extruded tubing having an inner, low-friction tube and an outer, higher-friction tube. The outer tube is coaxial with the inner tube and has an inner surface which is substantially contiguous with the outer surface of the inner tube. The diameter of the inner tube and the length of the tubing are selected for precisely limiting flow of water therethrough.

7 Claims, 4 Drawing Sheets

FLOW RESTRICTOR FOR WATER PURIFICATION SYSTEMS

BACKGROUND OF THE INVENTION

1. Field of the Invention

The present invention relates generally to water purification systems, primarily of the reverse osmosis type and more specifically to a flow restrictor for use therein and especially for installation between the waste water output of a reverse osmosis membrane canister and the drain to which the water purification system is connected, primarily for providing a selected hydraulic impedance for dropping the pressure from the feed water pressure level to the drain water pressure level.

2. Prior Art

The use of a flow restrictor in a reverse osmosis water purification system is well known. Flow restrictors for reverse osmosis systems come in a variety of configurations including orifice types, ball and seat types, needle valves and capillary types. Water pressure within the reverse osmosis system is at the feed water pressure level which is usually between 40 psig and 100 psig. However, because a relatively small percentage of the water passing through a reverse osmosis system is actually converted to purified water, a significant portion of the input water must be output to the drain to which the water purification system is connected. Because the typical drain pressure is at 0 psig, the principal purpose of the flow restrictor is to provide the required hydraulic impedance to permit an orderly reduction in the pressure level between the feed water pressure level and the drain pressure level and thus limit flow therebetween. Capillary type restrictors are inherently superior to orifice type restrictors because they are less likely to become clogged. In the past, such capillary flow restrictors have been relatively expensive and difficult to configure and manufacture. One reason for this expense and difficulty is the fact that pressure reduction is usually accomplished by passing the waste water through a relatively long, narrow teflon tube. Teflon is the usual material of choice for this tube because it resists the inadvertent and undesirable accumulation of mineral and sedimentary constituents of common feed water supplies as well as bio-foulants therein. Such an accumulation could inadvertently clog the flow restrictor tube which could then block the release of waste water and create havoc in the form of damage to the reverse osmosis membrane. Thus, teflon is selected because of its extremely low friction characteristics and also because it is an extremely inert material which does not readily adhere to any of the extraneous material in feed water and does not chemically degrade. Unfortunately, because of its low friction characteristics and its resistance to any form of adhering, teflon tubing is a difficult material to stabilize mechanically within a flow restrictor housing. Without such mechanical stabilizing, the teflon tube can be readily displaced from its desired position by the water pressure through the tube and ultimately produce leaks or otherwise create faults which can wreak as much havoc as a blocked tube. Two exemplary prior art teflon tube flow restrictors will be described hereinafter in more detail and it will be seen that there is still an ongoing need for a flow restrictor of the type which uses an elongated, narrow passage teflon tube which overcomes the mechanical stabilizing difficulties of the prior art, while also providing a means for reducing the mechanical complexities and commensurate expense of manufacturing such flow restrictors.

SUMMARY OF THE INVENTION

The present invention meets the aforementioned need by providing a flow restrictor primarily for use in reverse osmosis water purification systems wherein the flow restrictor comprises a selected length of elongated, co-extruded tubing having an inner teflon tube and an outer tube of higher friction material. The outer tube is coaxial with the inner tube and has an inner surface which is substantially contiguous along its entire length with the outer surface of the inner tube. The diameter of the inner surface of the inner tube and the length of the tubing are selected for limiting the flow of water therethrough. The diameter of the outer tube is selected to be readily accommodated in conventional tube fittings. Because of the novel double-extruded configuration of the inner and outer tubes of the present invention, the outer surface of the teflon tube is substantially engaged along its entire length, with the inner surface of the outer tube. The outer tube thus provides a completely-enclosing radial jacket for the inner teflon tube which therefore, bears against the inner teflon tube and resists the tendency of the teflon trade to expand from the water pressure therein. The present invention also provides a unique stopper device which can be readily installed at one end of the co-extruded tubing of the present invention for preventing the relative movement of the inner teflon tube along the outer tube in at least one direction. Normally because of its extremely low frictional surface, the teflon tube tends to slide axially within the outer tube, particularly when subjected to water pressure which would otherwise tend to move the inner teflon tube toward the drain end of the tube assembly. The stopper of the present invention is provided with a stem which can be inserted at one end of the outer tube for frictionally engaging the inner surface thereof and for abutting one end of the inner teflon tube. The frictional engagement of the stem with the inner surface of the outer tube is sufficient to prevent movement of the stopper which therefore resists the tendency for movement of the teflon tube in the direction of the stopper. The stopper is provided with a water passage for permitting the flow of water therethrough. Both ends of the co-extruded tubing of the present invention are provided with conventional tube fittings which permit interconnecting the flow restrictor of the present invention with the drain and water purification system in an otherwise conventional manner. The present invention thus provides a flow restrictor for use in water purification systems wherein the problems associated with such flow restrictors of the prior art are readily resolved by providing a simple, low-cost, easily fabricated flow restrictor configuration which also solves the aforementioned problems of mechanically stabilizing the teflon tube is such flow restrictors.

OBJECTS OF THE INVENTION

It is therefore a principal object of the present invention to provide a flow restrictor for use primarily in reverse osmosis water purification systems wherein reliable mechanical stabilization of a teflon tube through which waste water of such systems is made to pass is readily achieved.

It is an additional object of the present invention to provide a flow restrictor primarily for use in reverse osmosis water purification systems, the flow restrictor being configured as co-extruded, dual coaxial tubes for reducing the material and fabrication costs associated with flow restrictors of the prior art.

It is still an additional object of the present invention to provide a flow restrictor for use in water purification systems wherein hydraulic impedance is provided to limit the flow between the feed water pressure level and the drain pressure level, wherein teflon tubing is jacketed coaxially and contiguously with an outer tube and is prevented from moving in at least one direction therein by a stopper which is more mechanically reliable in stabilizing the teflon tube.

BRIEF DESCRIPTION OF THE DRAWINGS

The aforementioned objects and advantages of the present invention, as well as additional objects and advantages thereof, will be more fully understood hereinafter as a result of a detailed description of a preferred embodiment when taken in conjunction with the following drawings in which.

DETAILED DESCRIPTION OF A PREFERRED EMBODIMENT

Figure 1:
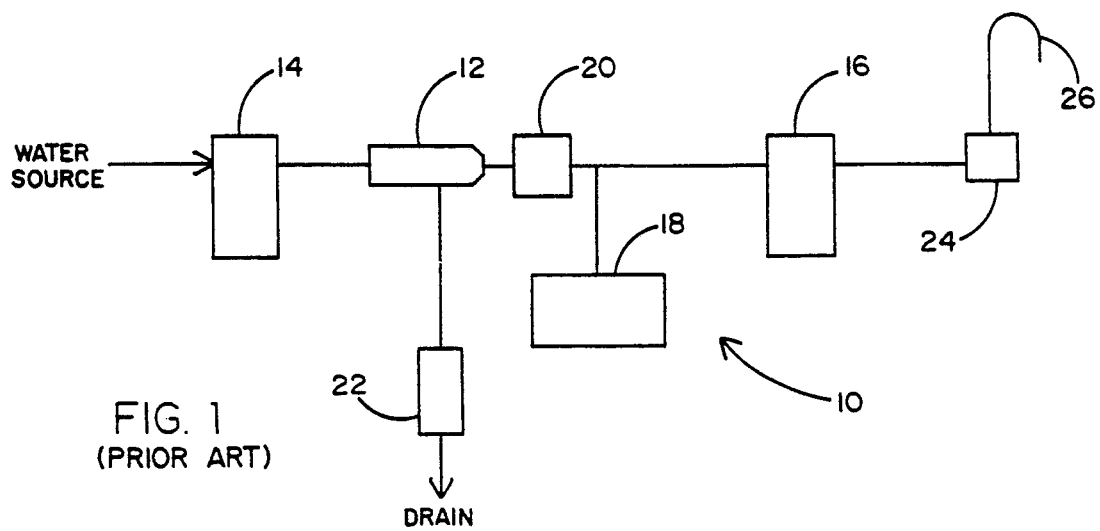
FIG. 1 is a block diagram of a prior art reverse osmosis water purification system.
Figure 2:
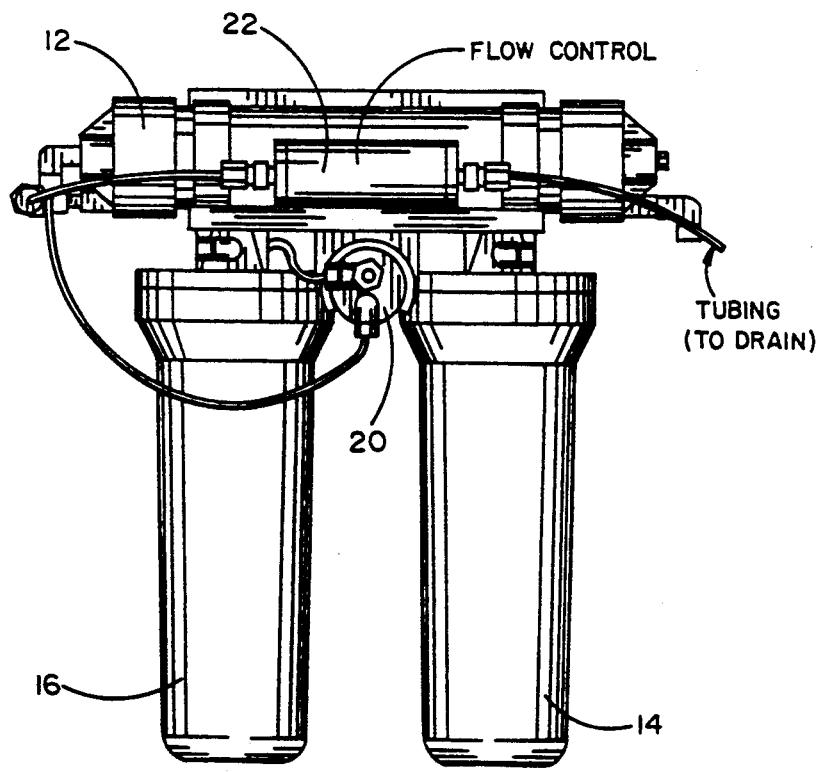
FIG. 2 is an elevational view of a prior art reverse osmosis water purification system.

Referring now to FIGS. 1 and 2, it will be seen that a typical prior art reverse osmosis water purification system 10, in which the present invention may be used, comprises a reverse osmosis membrane canister 12, a pre-filter 14, a post-filter 16, a water storage tank 18, a check valve 20, a flow restrictor 22, a manual valve 24 and a spout 26. Pre-filter 14 is connected to a source of water such as a conventional cold water line in a residence or commercial structure. Pre-filter 14 filters out large, non-soluble particles such as sediment and the like from the feed water before it is applied to the reverse osmosis membrane canister 12.

Canister 12 has two outputs; a purified water output which is applied to the storage tank 18 and the post-filter 16 and a waste water outlet which is applied to the flow restrictor 22. The feed water pressure at the input to canister 12 is generally in the range of 40 to 100 psig, which is the pressure at which most feed water systems operate in residences and commercial structures. A relatively small percentage of the feed water applied to canister 12 is treated by the reverse osmosis membrane contained therein and is output at the purified water outlet where it is stored in water storage tank 18 from which it can be drawn as desired. When water is drawn from storage tank 18, it first passes through post-filter 16 which provides one additional stage of filtering for organic chemicals, tastes and odors. The output of post-filter 16 is applied to a manually operable valve 24 which is typically an integral portion of a spout mechanism 26 through which the purified water may be accessed, such as at the top surface of a sink or countertop. Other water purification systems might direct the output of filter 16 to one or more storage tanks where the water may be heated or cooled.

That water output from reverse osmosis membrane canister 12 which is not passed through the membrane, exits the canister at a waste water outlet which is connected to flow restrictor 22. The pressure of the water exiting the canister at the waste water outlet is substantially the same as the feed water pressure available from the water source entering at the input to pre-filter 14. On the other hand, the pressure at the drain to which the water purification system 10 is connected is typically 0 psig or ambient. Accordingly, the principal function of flow restrictor 22 is to provide an appropriate pressure drop from a pressure of approximately 40 to 100 psig at the waste water outlet of canister 12 to a pressure of approximately 0 psig at the drain. Thus, flow restrictor 22 constitutes a hydraulic impedance for dropping pressure from the feed water pressure level to the drain water pressure level.

In typical reverse osmosis water purification systems, the necessary pressure drop across the length of the flow restrictor is provided by a teflon tube of selected length and inner diameter to present the appropriate hydraulic impedance to the water flow. Typical prior art flow restrictors used in reverse osmosis water purification systems for this purpose take the form of a cylindrical housing, such as that shown in FIG. 2 and 3. The principal purpose for utilizing a teflon tube is that teflon is a material which exhibits extremely low friction and is chemically inert. Thus, it is virtually impossible to accumulate any blockage of minerals or other chemical ingredients that might, over the long term, block the passage of water therethrough and otherwise defeat the purpose of the flow restrictor.

Complete blockage of the flow restrictor will result in damage to the reverse osmosis membrane in canister 12 that may go undetected and otherwise defeat the proper operation of the membrane, thereby defeating the purification function of the apparatus 10.

Unfortunately, as previously described, teflon tubes are difficult to stabilize mechanically and seal hydraulically on their outer surfaces and any unexpected movement of the teflon tube, such as from the constantly applied pressure differential across the flow restrictor, can ultimately produce the same undesirable effects as a blocked tube. Consequently, attempts have been made in prior art flow restrictors using teflon tubes to mechanically secure the tube in such a way that in spite of such pressure it remains stable.

Figure 3:
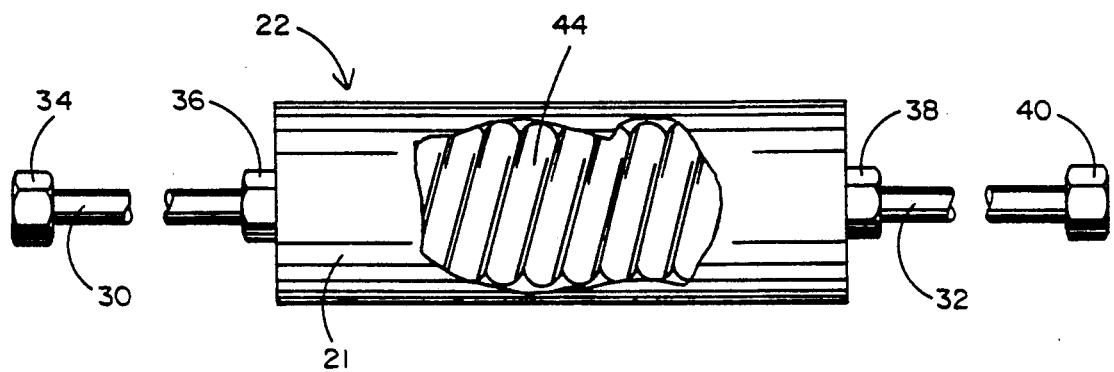
FIG. 3 is a partially cut-away elevational view of a prior art flow restrictor.
Figure 4:
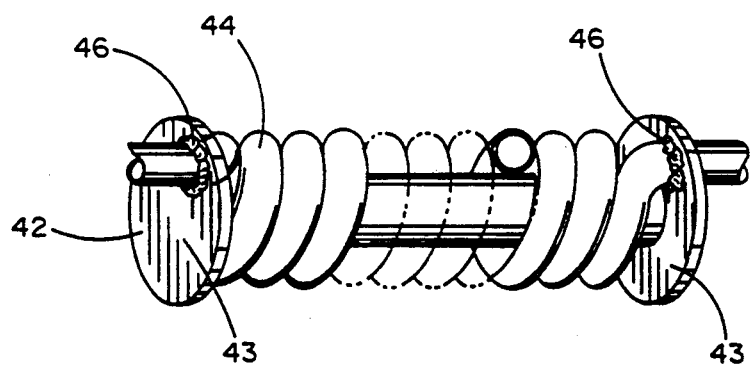
FIG. 4 is perspective view of the interior configuration of the prior art flow restrictor shown in FIG. 3.

One example of this is illustrated in FIGS. 3 and 4, which depict the typical construction of a prior art flow restrictor that may be used in a reverse osmosis water purification system. As shown therein, such a prior art reverse osmosis system flow restrictor 22, employs a cylindrical housing 21 to which there is attached an inlet tube 30 and an outlet tube 32. Inlet tube 30 is secured by means of a fitting 36 and has at its end opposite fitting 36, a second fitting 38 which is used to attach inlet tube 30 to the waste water output of the canister 12. Similarly, housing 21 is provided with fitting 38 to secure the outlet tube 32 to the housing. Outlet tube 32 is also provided with a second fitting 40 at the end thereof which is attached to a typical drain system.

The interior of cylindrical housing 21 is provided with a spool-like structure 42 around which a teflon tube is wound in a helical fashion. Teflon tube 44 is configured to pass through end caps 43 of the spool 42, through appropriate sized holes therein. Tube 44 is secured thereto (at least an attempt is made to secure) by means of an epoxy 46 or other comparable adhesive material in order to prevent the teflon tube 44 from changing its position in response to the pressure of the water flowing therethrough. Unfortunately, as previously indicated, the nature of the teflon material of which tube 44 is made, generally prevents a secure adherence of the epoxy or other such material to the teflon surface, thereby making it relatively difficult, if not unreliable, to secure the teflon tube within the holes provided in the caps 43 of spool 42. Furthermore, it will be seen in FIGS. 3 and 4 that the structure of the prior art flow restrictor 22 shown therein, is of a relatively complex nature, requiring a significant amount of labor to assemble, as well as costly materials including the spool, the cylindrical housing and four fittings which must be used to interface the flow restrictor with the canister 12 and a drain. Furthermore, wrapping the teflon tube tends to flatten the tube and the reduced inside diameter increases the probability of a clog occurring.

Figure 5:
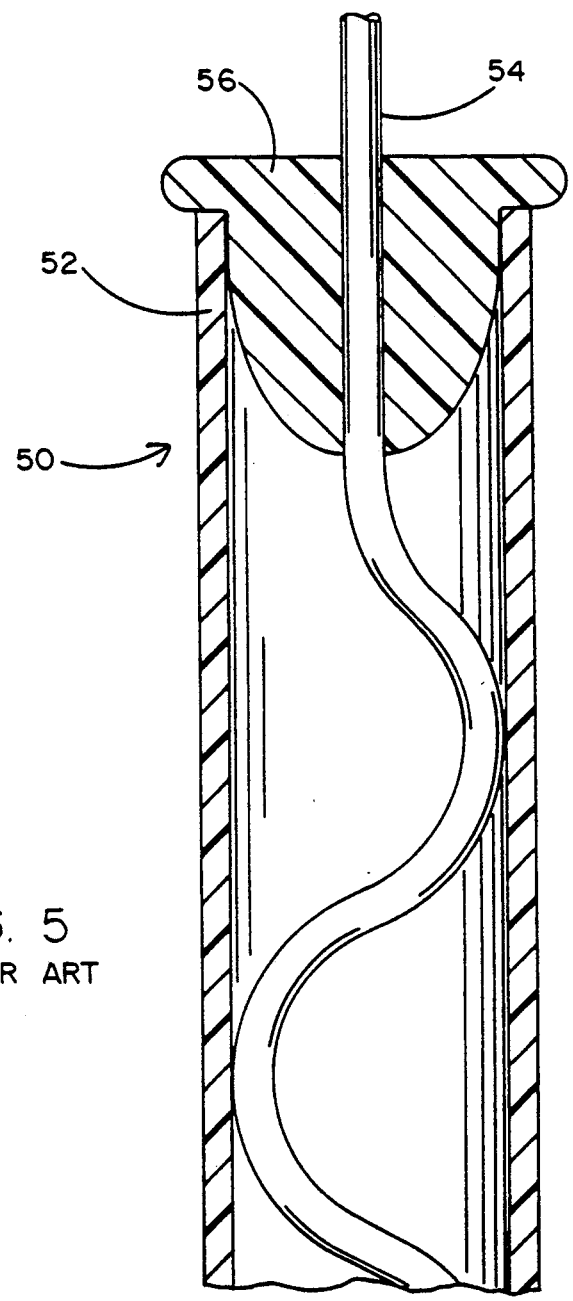
FIG. 5 is a partially cross-sectioned view of an additional prior art flow restrictor.
Figure 6:
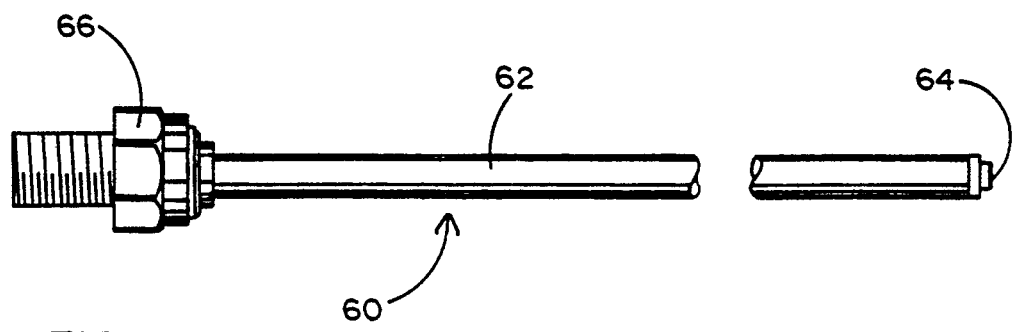
FIG. 6 is an elevational view of the flow restrictor of the present invention.

One prior art attempt at overcoming the disadvantages of the flow restrictor shown in FIGS. 3 and 4, is illustrated in FIG. 5. The prior art flow restrictor 50 of FIG. 5, provides an outer tube 52 through which there is threaded an inner teflon tube 54. A plug 56 is provided at the end of outer tube 52 for purposes of securing the teflon tube by immobilizing it relative to the outer tube 52. For this purpose, plug 56 is provided with an axial passage through which the end of the tube passes as it exits the outer tube 52. As seen in FIG. 5, plug 56 provides the only means for securing the teflon tube relative to the outer tube. Consequently, over a vast majority of the length of the teflon tube within the outer tube 52, there is no application of a force to immobilize the teflon tube. As a consequence of this, a fitting (not shown) applied around the outside of outer tube 52 and plug 56 must exert a very significant degree of radial force to effectively squeeze plug 56 radially against the outer radial surface of teflon tube 54. This often leads to undesirable consequences. For example, if the radial force applied to plug 56 is inadequate to secure the teflon tube 54, the latter moves with respect to the outer tube 52, causing the problems previously described. On the other hand, if the radial force applied to the plug 56 is too large, this force then constricts the teflon tube 54, thereby interfering with the desired flow characteristics of the teflon tube, altering the flow characteristics of the flow restrictor 50 and increasing the possibilities for blockage, despite the low-friction surface of the teflon tube.

The present invention, which is designed to overcome the problems associated with such prior art flow restrictor configurations, may be best understood by referring to FIGS. 6 through 9. As shown therein, the flow restrictor 60 of the present invention comprises a selected length of elongated co-extruded tubing 62, at least one end of which is normally terminated with an inner tube stopper 64 for preventing relative movement between the inner tube and the outer tube in at least one axial direction. Unlike the prior art flow restrictor of FIGS. 3 and 4, flow restrictor 60 of the present invention requires no housing, no special winding of the teflon tube and no application of epoxy or other adhesive in an attempt to stabilize the tube relative to the housing. Furthermore, unlike the prior art flow restrictor of FIGS. 3 and 4, flow restrictor 60 requires only two fittings, such as fitting 66 shown on the left side of FIG. 6. It will be understood that in normal applications, a second fitting 66 would also be provided at the right end of the tubing 62.

Figure 7:
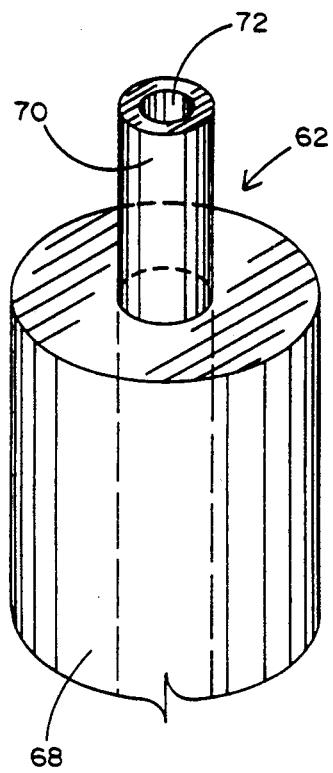
FIG. 7 is an enlarged perspective view of the tube construction of the present invention.
Figure 8:
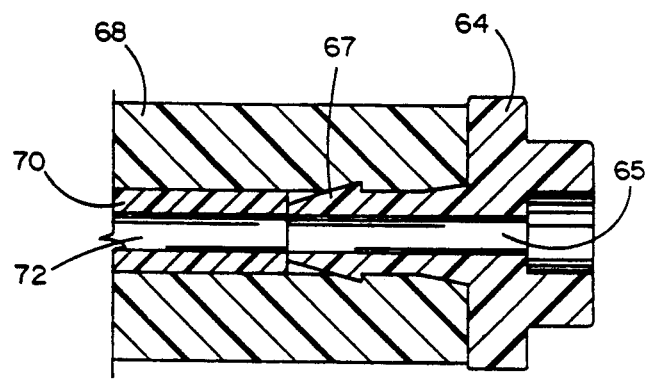
FIG. 8 is a cross-sectional view showing one end of the flow restrictor of the present invention.

As seen in more detail in FIGS. 7 and 8, flow restrictor 60 of the present invention provides an inner teflon tube 70 and an outer tube 68 which are coaxial and contiguous along their length. Thus, the inner surface diameter of outer tube 68 is substantially equal to the outer surface diameter of teflon tube 70 so that there is intimate contact between those respective surfaces along the entire length of tubing 62. Consequently, upon the application of water pressure to the flow passage 72 through teflon tube 70, even the slightest expansion of teflon tube 70, resulting from such water pressure, increases the mechanical interlocking relationship between the two tubes 70 and 68, along virtually the entire length thereof. This elongated interlocking relationship is significantly superior to the prior art configuration of FIG. 5 which, as previously described, provides a form of mechanical constriction only along the length of plug 56 therein.

Figure 9:
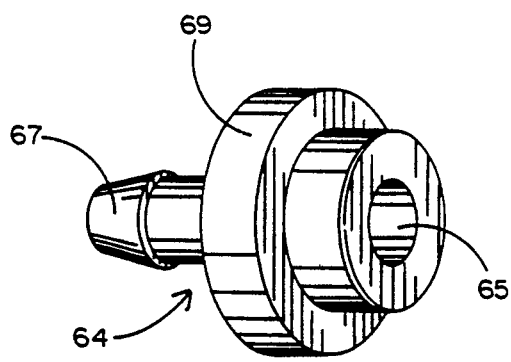
FIG. 9 is an isometric view of a stopper used in the present invention.

The movement of teflon tube 70 relative to outer tube 68 is further constrained in the present invention by means of an inner tube stopper 64 which has a passage 65 therethrough, coaxial with passage 72 of teflon tube 70. This stopper 64, which is shown in FIG. 9, is designed to frictionally engage the outer tube 68 by means of a press-fit relationship with the inner surface of outer tube 68 using an insert stem 67. Stem 67 is inserted at one end of the tubing 62 so that it extends into the outer tube 68 until an end flange 69 comes in contact with the end of outer tube 68. The teflon tube 70 is cut to an appropriate length so that the stem 67 abuts the end of teflon tube 70. It has been found that it is necessary to provide only one such stopper 64 at the drain end of the flow restrictor 60 because the tendency of teflon tube 70 to move relative to the outer tube 68 is generally only in the direction of water flow which is toward the drain. In typical applications, flow restrictor 60 is approximately five feet to seven feet in length, outer tube 68 is made of polyethylene and has an outer diameter of about 0.25 inches an inner diameter of about 0.06 inches; teflon tube 70 has an outer diameter of about 0.06 inches and an inner diameter of about 0.03 to 0.04 inches. Of course, it will be understood that the actual materials and dimensions of the flow restrictor of the present invention shown herein are not limiting of the invention as they are readily altered to accommodate flow restrictor requirements that may deviate from the embodiment of the invention that has actually been reduced to practice.

It will now be understood that what has been disclosed herein comprises a flow restrictor that is intended primarily for use in a reverse osmosis water purification system of the type having a reverse osmosis membrane housing receiving feed water to be purified and generating purified water at a first outlet and waste water at a second outlet. The flow restrictor of the invention comprises a selected length of elongated, co-extruded tubing having an inner, low-friction tube and an outer, higher-friction tube. The outer tube is coaxial with the inner tube and has an inner surface which is substantially contiguous with the outer surface of the inner tube. The diameter of the inner tube and the length of the tubing are selected for precisely limiting flow of water therethrough. The present invention provides a flow restrictor which is of simple structure and therefore easier and less expensive to fabricate. Furthermore, it uses no housing and has only two fittings. More importantly, the present invention permits the use of a teflon inner tube which is preferable for use in water purification systems, but overcomes the aforementioned prior art disadvantages of using a teflon tube surface which is difficult to stabilize mechanically. The present invention stabilizes the teflon tube by making it contiguous to an outer tube along substantially its entire length. Stabilization is achieved also by providing at least one inner tube stopper which comprises insert stem which is press fit into the outer tube and frictionally engages the inner surface of the outer tube while abutting the end of the inner tube. The stopper prevents relative motion of the inner tube in a direction towards the drain that would normally be the direction in which the inner teflon tube would have a tendency to move as a result of the water pressure applied therethrough.

Those having skill in the art to which the present invention pertains, will now as a result of the applicants' teaching herein, perceive various modifications and additions which may be made to the invention. By way of example, the relative dimensions of the two tubes used herein, as well as the shape and dimensions of the inner tube stopper illustrated herein, may all be readily modified to accommodate different flow restrictor performance requirements. Furthermore, the specific materials referred to herein may also be modified while still providing the advantageous geometry and tube configuration described. Accordingly, all such modifications and additions are deemed to be within the scope of the invention, which is to be limited only by the claims appended hereto.

We claim:

1. A flow restrictor for use in a reverse osmosis water purification system of the type having a reverse osmosis membrane housing receiving feed water to be purified and generating purified water at a first outlet and waste water at a second outlet; the flow restrictor comprising:

a selected length of elongated, tubing having an inner flexible low-friction tube and an outer higher-friction tube for liquid flow of a predetermined pressure therethrough, the outer tube being coaxial with the inner tube and displaceable with respect thereto, said outer tube having an inner surface which is substantially continually contiguous with the outer surface of the inner tube, said liquid flow deforming said flexible low-friction tube in a radial outward direction for positionally stabilizing said inner tube with respect to said outer tube, the inner diameter of said inner tube and the length of said tubing being selected for limiting flow of water therethrough;

inner tube stopper means for preventing displacement of said inner tube with respect to said outer tube in at least one axial direction, said inner tube stopper means having an insert stem insertable into an end of said tubing for frictionally engaging said inner surface of said outer tube and abutting an end of said inner tube; and, means for connecting said tubing to said second outlet.

2. The flow restrictor recited in claim 1 wherein said inner tube is made of teflon and said outer tube is made of polyethylene.

3. A flow restrictor for use in water purification systems in which a flow restrictor provides a hydraulic impedance for dropping pressure from the feed water pressure level to the drain water pressure level; the flow restrictor comprising:

a first elongated tube having a length and inner diameter selected for providing the desired hydraulic impedance;

a second elongated tube having a length substantially equal to the length of said first tube and having an inner diameter substantially equal to the outer diameter of said first tube, said first tube being displaceable with respect to said second elongated tube when said first tube is inserted within said second tube;

said first and second tubes being configured in coaxially contiguous relation; and means for preventing movement of said inner tube in at least one direction through said outer tube, said means for preventing movement including an inner tube stopper having an insert stem and an integral end flange, said insert stem being inserted into an end of said second tube for frictionally engaging an inner surface of said second tube, said stem having an axially directed water passage therethrough.

4. The flow restrictor recited in claim 3 wherein said first tube is made of teflon and said second tube is made of polyethylene.

5. The flow restrictor recited in claim 3 wherein said selected length and inner diameter provide a drop in pressure in the range of 30 to 80 psi.

6. The flow restrictor recited in claim 3 further comprising means for connecting one end of said first and second tubes to a drain and for connecting another end of said first and second tubes to said water purification system.

7. The flow restrictor recited in claim 6 wherein said water purification system is a reverse osmosis water purification system.

* * * * *